J. M. & H. E. JOHNSON.
TRACTOR.
APPLICATION FILED JULY 19, 1913.
1,127,629.
Patented Feb. 9, 1915.
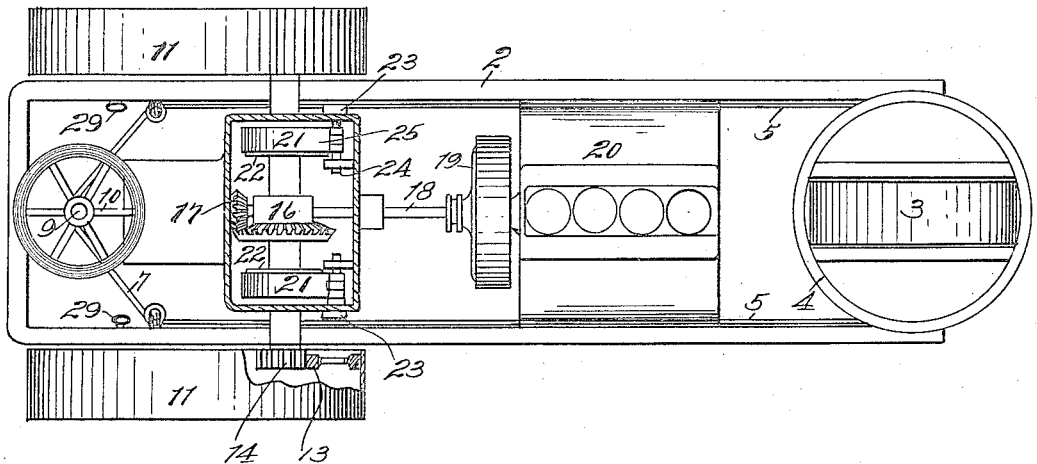
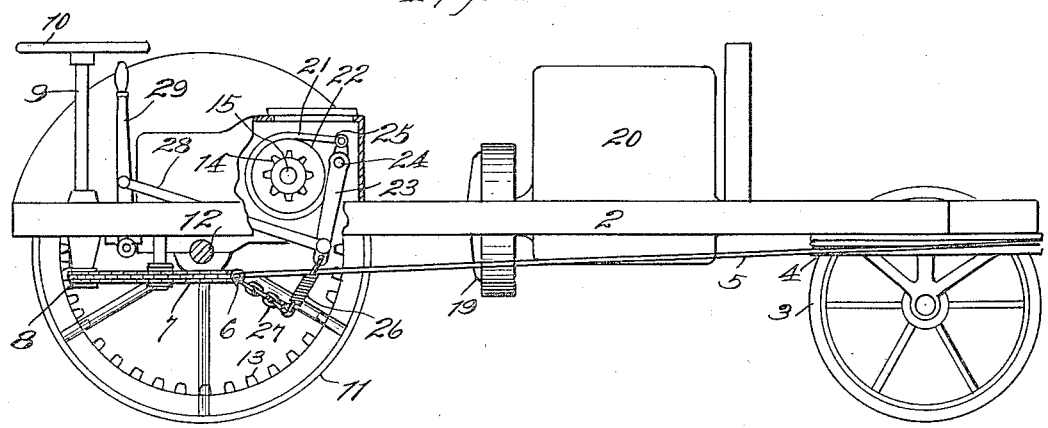
WITNESSES:
F. E. Maynard
Thos. Kottberg
INVENTORS.
John M. Johnson
Henry E. Johnson
BY G. H. Strong.
ATTORNEY

UNITED STATES PATENT OFFICE.

JOHN M. JOHNSON AND HENRY E. JOHNSON, OF WINTERS, CALIFORNIA.

TRACTOR.

1,127,629.

Specification of Letters Patent.

Patented Feb. 9, 1915.

Application filed July 19, 1913. Serial No. 780,026.

*To all whom it may concern:*

Be it known that we, JOHN M. JOHNSON and HENRY E. JOHNSON, both citizens of the United States, residing at Winters, in the county of Yolo and State of California, have invented new and useful Improvements in Tractors, of which the following is a specification.

This invention relates to traction engines, and particularly to a tractor having means rendering it particularly useful for work in orchards, vineyards and under other conditions where it is desirable or necessary that the machine should be able to make short turns.

It is the object of the present invention to provide a tractor having means automatically operative for the application of resistance to the inside of either of the traction wheels at a predetermined time when making a turn, and further to provide means whereby a braking force can be applied to either of the wheels independently, or to both simultaneously with equal or different pressures.

A further object of the present invention is to provide in combination with a tractor, a driving mechanism including a drive-shaft with a differential gear, and means for applying a braking force to either of the driven wheels, said means being automatically operative after a predetermined amount of movement of the steering wheel of the tractor has taken place.

The present invention consists in the combination in a tractor, having a steering wheel or mechanism and a driving shaft provided for differential movement, of means operable and controlled by the steering mechanism for applying a braking resistance to the inside turning wheel when making turns in either direction; and further consists in the provision of manually-operable devices whereby said braking mechanism can be applied, safely and independently of the operation of the steering mechanism.

The invention consists of the parts and the combination and construction of parts as hereinafter more fully described and claimed, having reference to the accompanying drawings, in which—

Figure 1 is a side elevation of the improved tractor, partly broken away to show the brake mechanism on one side. Fig. 2 is a plan view of the tractor, showing the braking mechanism in detail.

In the drawings 2 represents a suitable form of frame or chassis for the tractor, which is supported at its forward end upon an appropriate type of steering wheel 3, having a horizontally disposed turnable table 4 to which is connected operating links or connections 5, one on each side, and which are extended rearwardly and joined, as at 6, to a chain or other operating connection 7, and engaging and being operable by a sprocket or suitable driver 8, here shown as secured on a hand-wheel shaft 9, turnable by a hand-wheel 10, at the top. The rear end of the tractor is supported by a pair of traction wheels 11, on a transverse axle 12; the traction wheels 11 being provided each with a gear 13; these gears being respectively engaged and driven by pinions 14 which are secured on the outer ends of a two-part drive shaft 15 which forms a portion of the differential mechanism, indicated generally at 16, to which power is transmitted by a transmission gear, indicated at 17. The transmission gear derives power from a driving shaft 18, which may be connected by a clutch 19 to a suitable motor 20 on the chassis.

The short turning of this machine is aided by the use of a suitable type of brake-clutches or brakes 21, which may be applied to brake-wheels 22, fast on the sections of the drive shaft 15. The brakes 21 are adapted to be operated by divers means, which partly consist of levers 23 secured to rocker shafts 24, to which are connected the free ends 25 of the brakes 21. The brake-operating levers 23, of which there is one for each of the traction wheels 11, are extended downwardly and connected to the adjacent tension members of the steering connections 5; in the present instance the levers 25 being shown as connected by a yieldable, flexible means including a spring 26 secured at one end to its adjacent lever 23 and attached at the other end to a piece of chain or other suitable connection 27 which is attached in the present case to the joint 6 of the chain 7.

Preferably the connections 26—27, which join the levers 23 to the steering connection 7, are normally sufficiently slack to permit the turning movement of the steering wheel 3, when the hand-wheel 10 is operated a predetermined amount of movement either side of its normal center line, without drawing the connections 26—27 toward it; thus enabling the tractor to turn in circles of large radius freely. After the hand-wheels 10 have been turned sufficiently then the tension members 5—7 on one side will, as it moves rearwardly, draw the lever connections 26—27 taut, and thus rock the lever 23 and its rocker-shaft 24, to apply the brake 21 to the brake-wheel 22; the flexible part 26 of the connection affording a safety against excessive strains and causing the brake band 21 to be applied gradually during its application.

Since there is one of the brake mechanisms on each side of the differential gear 16, and the lever 23 of each of the brake mechanisms being respectively connected to that portion of the tension element 5—7 on its adjacent side of the frame, it will be seen that as the steering wheel 3 passes a predetermined angular relation off the central position toward either side that that particular brake 21 which is related to the inside wheel, that is the traction wheel on the inside of the curve about which the vehicle is turning, will be applied; thus increasing the resistance offered to the differential gear by the checking action of the brake on its respective section of shaft 15, and causing the power to be transferred to that traction wheel which is on the outside of the curve in which the tractor is swinging.

As it may be desirable to apply the friction brakes when the vehicle is on the downgrade, and also in case one of the wheels strikes a soft or smooth place and should slip, there is provided and connected to each of the brake-applying levers 23 a link 28, to one end of which is connected a hand-lever 29, which, when operated, actuates its respective lever 23 to apply its brake 21. As there is one of the hand-levers 29 on each side of the tractor for applying the brakes 21, it is manifest that the traction wheels 11 can be independently controlled by the application of its respective brake 21, and also in case of necessity both of the hand-levers 29 can be simultaneously operated so as to apply both the brakes at once.

Thus we have provided a tractor for all purposes and especially contrived to work in an orchard and among trees or any place where it is desirable that the machine should be able to turn short. The short turning of this machine is aided by the use of two friction clutches or brake clutches, one on either side of the differential, which are made to work automatically with the tiller wheel. These clutches can be so adjusted that they will not come into play until the tiller wheel is turned to any desirable angle to either side of its central position, therefore having no effect when the tractor is turning in a large radius. These friction brakes or clutches are also connected with levers, one for each side, which can be used at will for increasing or decreasing the friction on either side independently or simultaneously. It is obvious that the brake levers can also be used for applying the brakes to the drive wheels when going down grade, and also in case one wheel strikes a soft or smooth place and should slip, friction can be applied to this wheel and thus aid the other drive wheel in pulling out of the difficult place.

The advantage of this method over the tractor with an independent clutch for each drive wheel and no differential is that the operator on the latter must, in turning, operate the tiller wheel and also the clutch engaging with the inside drive wheel at the same time which requires considerable skill and attention, and the tractor with a differential and no friction brakes on either side cannot turn short enough for all purposes in loose soil, such as are encountered in all orchard work and cultivation in general on the farm.

Having thus described our invention what we claim and desire to secure by Letters Patent is:

1. In a tractor having steering means, and a pair of drive wheels, a differential mechanism including a two-part drive shaft for operating said wheels, a brake mechanism for each of said two parts of the drive shaft, a connection embodying a spring element extending from each brake mechanism to said steering means, and means whereby the brake mechanisms may be separately operated independently of the steering means.

2. In a tractor having a pair of drivers and a steering mechanism, means for retarding each driver, and spring means for connecting each of said retarding means to the steering mechanism whereby after said steering mechanism has been turned to a predetermined extent one of the retarding means will be rendered operative.

3. In a tractor having a pair of drivers and a steering mechanism, a brake mechanism for each of said drivers, and expansible and contractible means connecting each brake with the steering mechanism, whereby when the latter is turned in one direction the corresponding brake will be applied and when turned in an opposite direction the other brake will be applied.

In testimony whereof we have hereunto set our hands in the presence of two subscribing witnesses.

JOHN M. JOHNSON.
HENRY E. JOHNSON.

Witnesses:
  R. L. NIEMANN,
  R. C. GATES.